United States Patent
Tsukamoto

(10) Patent No.: US 11,838,625 B2
(45) Date of Patent: Dec. 5, 2023

(54) APPARATUS, SYSTEM, METHOD AND COMPUTER READABLE STORAGE MEDIUM FOR GENERATING POSITIONAL INFORMATION OF OPTICAL MEMBER AND TIMING INFORMATION RELATING THERETO

(71) Applicant: CANON KABUSHIKI KAISHA, Tokyo (JP)

(72) Inventor: Suguru Tsukamoto, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/519,399

(22) Filed: Nov. 4, 2021

(65) Prior Publication Data

US 2022/0150405 A1     May 12, 2022

(30) Foreign Application Priority Data

Nov. 10, 2020   (JP) ................. 2020-187287

(51) Int. Cl.
*H04N 23/60* (2023.01)
*H04N 23/80* (2023.01)

(52) U.S. Cl.
CPC ........... *H04N 23/665* (2023.01); *H04N 23/64* (2023.01); *H04N 23/80* (2023.01)

(58) Field of Classification Search
CPC ........... H04N 5/23227; H04N 5/23222; H04N 5/23229; H04N 5/23225; H04N 5/23209; H04N 23/665; H04N 23/64; H04N 23/80; H04N 23/617; H04N 23/663

USPC ........................................ 348/222.1
See application file for complete search history.

(56) References Cited

U.S. PATENT DOCUMENTS

| | | | |
|---|---|---|---|
| 2003/0095798 A1* | 5/2003 | Sakamoto | H04N 5/2256 396/85 |
| 2004/0027453 A1* | 2/2004 | Hasegawa | G08B 13/19691 348/143 |
| 2004/0109065 A1* | 6/2004 | Tokunaga | H04N 5/335 348/222.1 |
| 2006/0092289 A1* | 5/2006 | Kawahara | H04N 5/232 348/222.1 |
| 2013/0064533 A1* | 3/2013 | Nakata | G03B 17/02 396/76 |
| 2013/0202274 A1* | 8/2013 | Chan | H04N 7/185 386/362 |
| 2014/0006188 A1* | 1/2014 | Grigg | G07F 9/009 705/17 |
| 2014/0293440 A1* | 10/2014 | Okawa | G02B 15/145 359/698 |

FOREIGN PATENT DOCUMENTS

| | | |
|---|---|---|
| JP | 5480515 B2 | 4/2014 |
| JP | 2017-49192 A | 3/2017 |
| JP | 2020-38347 A | 3/2020 |

* cited by examiner

*Primary Examiner* — Usman A Khan
(74) *Attorney, Agent, or Firm* — CANON U.S.A., INC. IP Division

(57) ABSTRACT

An apparatus includes an optical member, a detector configured to detect a quantity relating to a position of the optical member, and a processor configured to generate positional information of the optical member based on the quantity relating to the position. The processor is configured to generate timing information of the detection corresponding to the positional information.

19 Claims, 9 Drawing Sheets

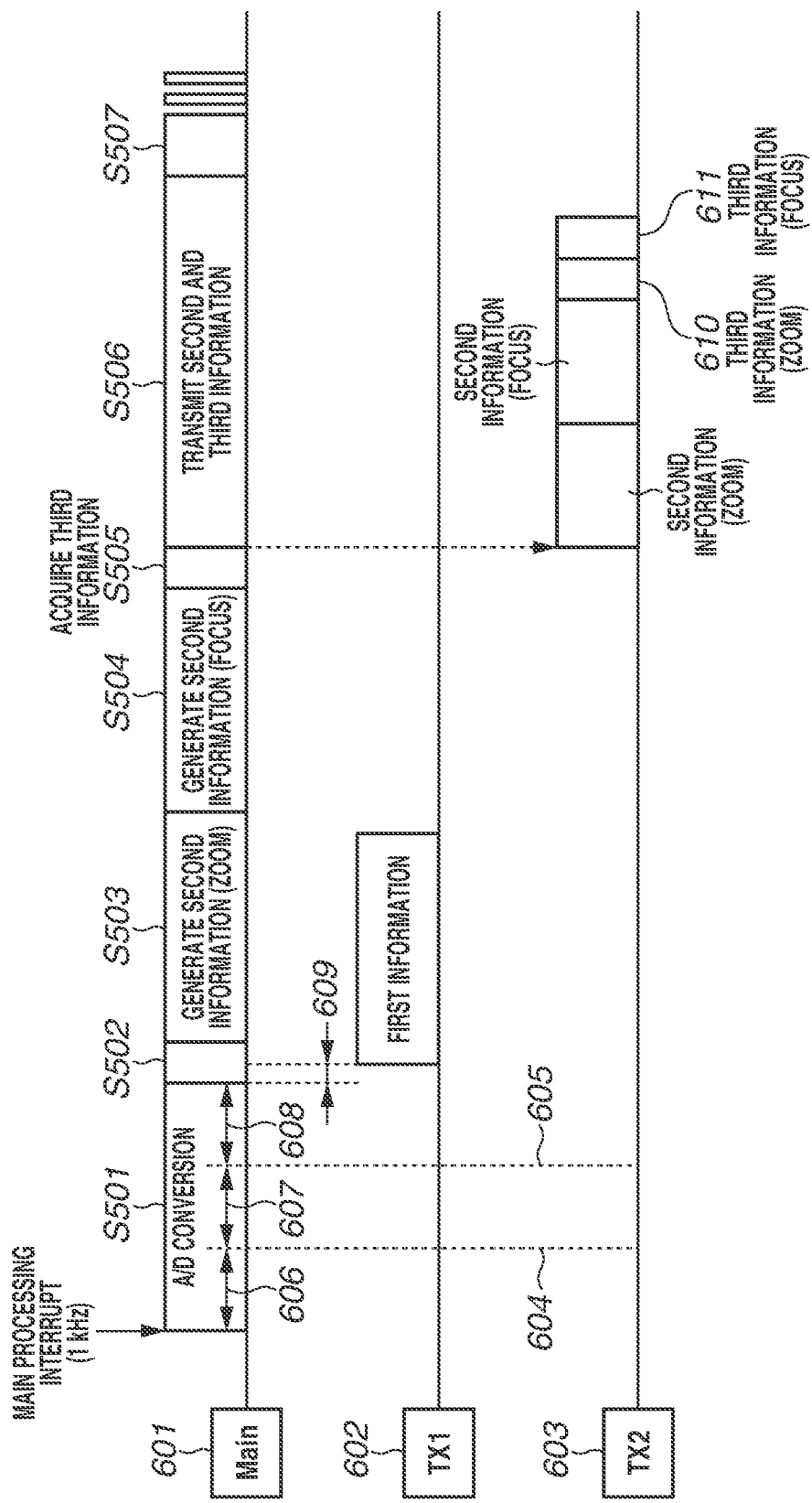

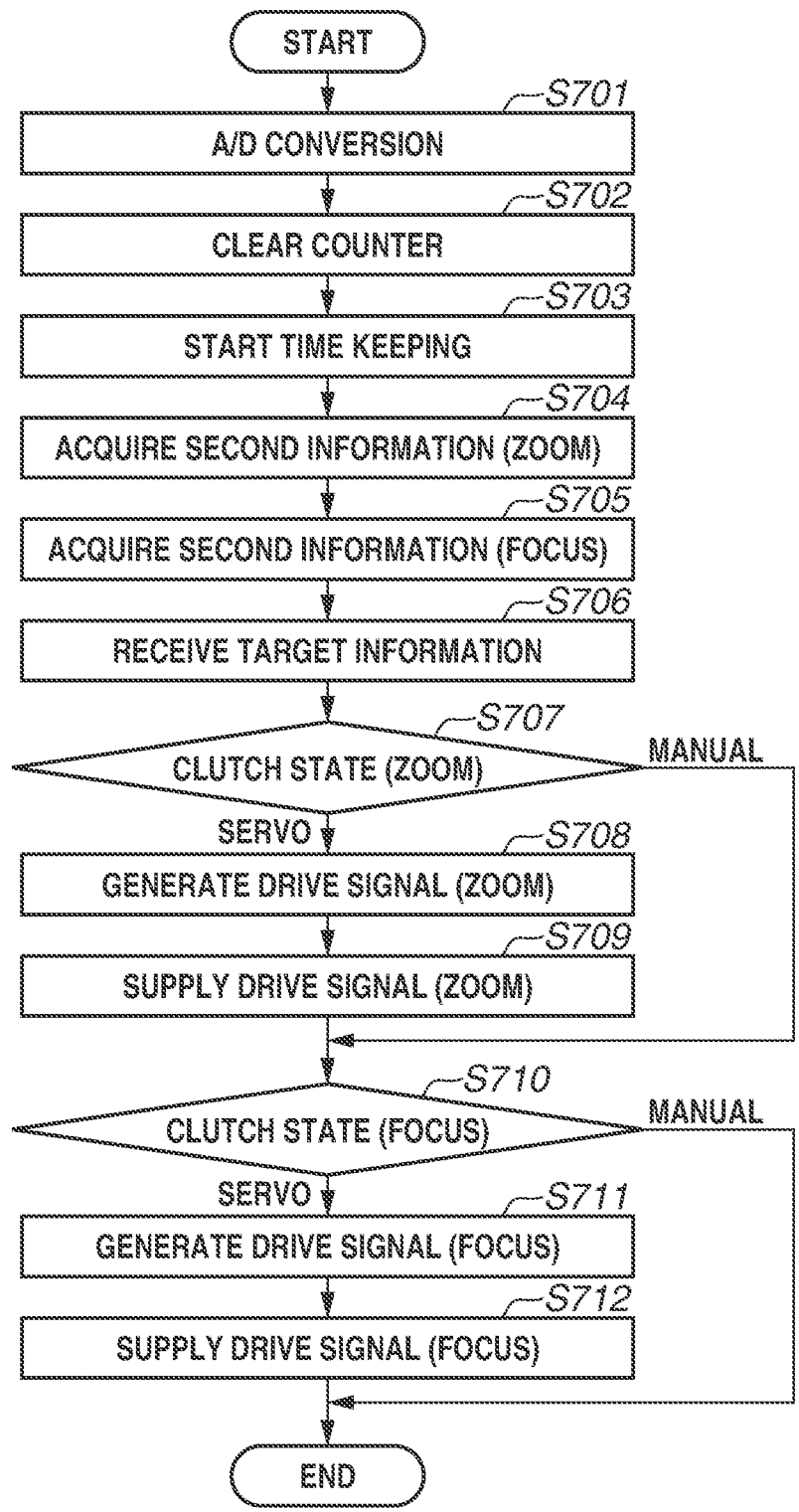

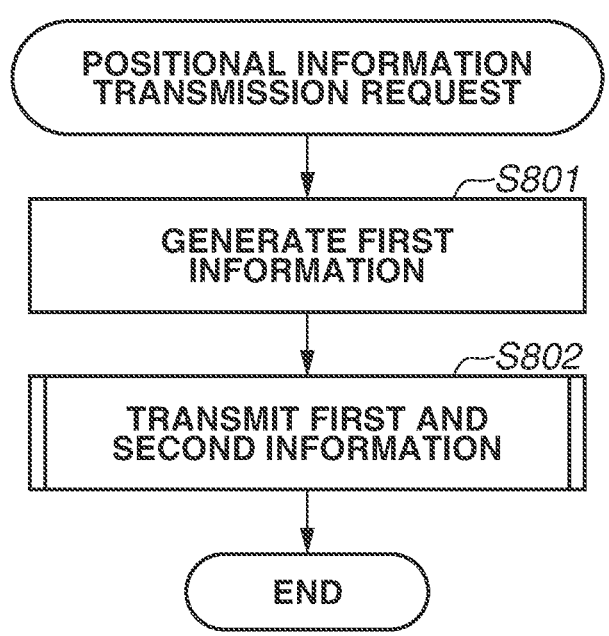

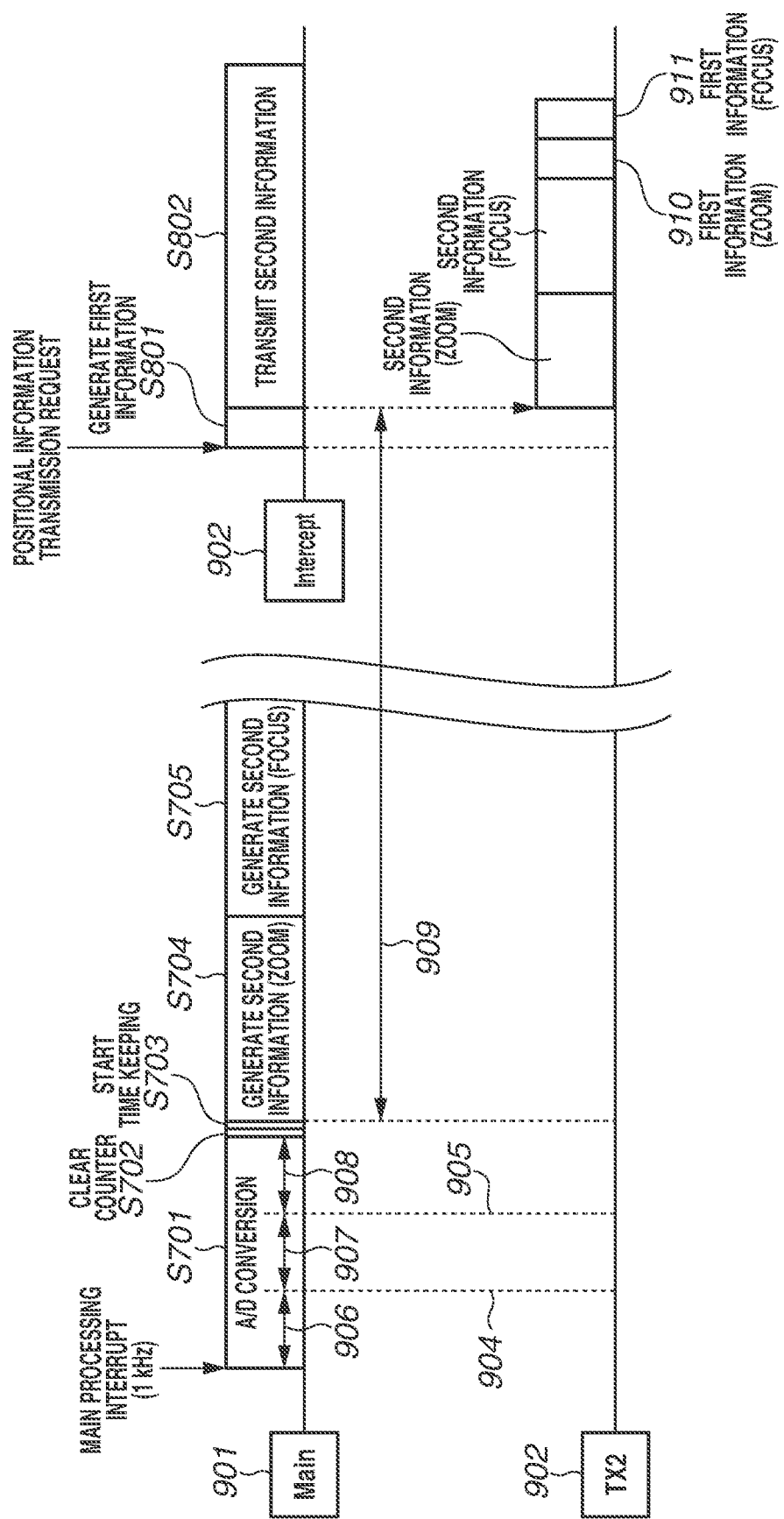

… (US 11,838,625 B2)

APPARATUS, SYSTEM, METHOD AND COMPUTER READABLE STORAGE MEDIUM FOR GENERATING POSITIONAL INFORMATION OF OPTICAL MEMBER AND TIMING INFORMATION RELATING THERETO

BACKGROUND OF THE DISCLOSURE

Field of the Disclosure

The aspect of the embodiments relates to an optical apparatus, a camera apparatus, a processing apparatus, a system, a processing method, and a computer readable storage medium.

Description of the Related Art

Japanese Patent No. 5480515 discusses an interchangeable lens (lens apparatus) to acquire positional information about the focus lens in synchronization with a timing signal transmitted from the camera body (camera apparatus), from the viewpoint of the accuracy of position detection of the focus lens. Japanese Patent No. 5480515 also discusses the camera body to transmit a request signal for requesting the positional information from the interchangeable lens in a cycle longer than the cycle of the timing signal, and the interchangeable lens to collectively transmit a plurality of pieces of acquired positional information.

The interchangeable lens discussed in Japanese Patent No. 5480515 acquires the positional information about the focus lens in synchronization with the timing signal transmitted from the camera body, but in actuality, the synchronization has an error (a time (a point in time or timing) of the acquisition is delayed from a time of the transmission of the timing signal).

SUMMARY OF THE DISCLOSURE

According to an aspect of the embodiments, an apparatus includes an optical member, a detector configured to detect a quantity relating to a position of the optical member, and a processor configured to generate positional information of the optical member based on the quantity relating to the position. The processor is configured to generate timing information of the detection corresponding to the positional information.

Further features of the disclosure will become apparent from the following description of exemplary embodiments with reference to the attached drawings.

BRIEF DESCRIPTION OF THE DRAWINGS

FIG. 6 is a diagram illustrating processing and signal timings according to the second exemplary embodiment.

FIG. 7 is a flowchart of processing in the third exemplary embodiment.

FIG. 8 is a flowchart of processing (interrupt processing) in the third exemplary embodiment.

FIG. 9 is a diagram illustrating processing and signal timings according to the third exemplary embodiment.

DESCRIPTION OF THE EMBODIMENTS

Figure 1:
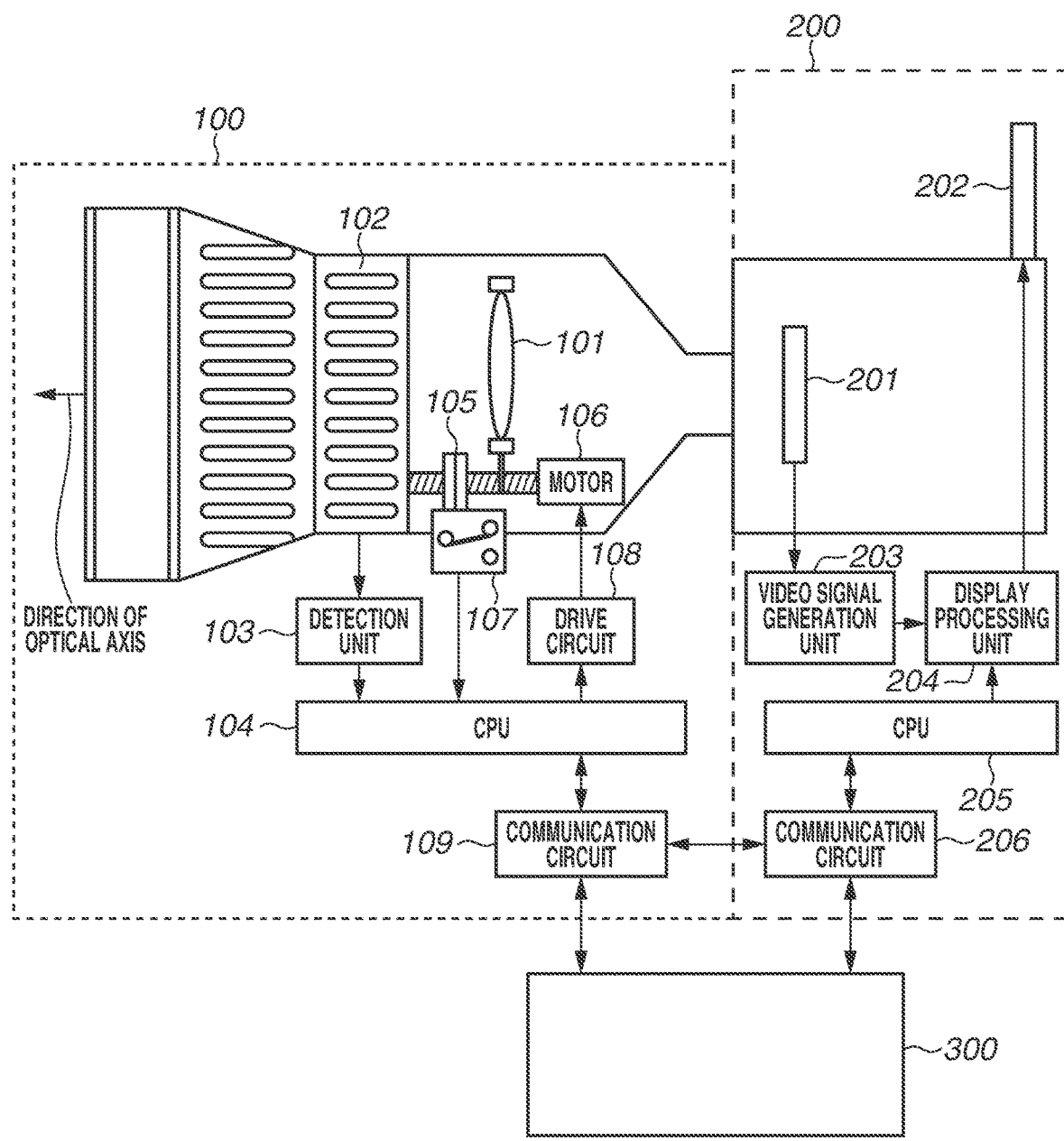
FIG. 1 is a diagram illustrating a configuration example of an optical apparatus according to a first exemplary embodiment.

Hereinafter, some exemplary embodiments of the disclosure will be described with reference to the accompanying drawings. Like numbers refer to like members throughout the drawing for describing the exemplary embodiments on principle (unless otherwise specified), and duplicated description thereof will be omitted herein.

FIG. 1 is a diagram illustrating a configuration example of an optical apparatus according to a first exemplary embodiment. Referring to FIG. 1, the optical apparatus includes a lens apparatus 100 and a camera apparatus 200. Alternatively, for example, the optical apparatus may include the lens apparatus 100 as an interchangeable lens apparatus without the camera apparatus 200. In that case, the lens apparatus 100 (interchangeable lens apparatus) is detachably attached to the camera apparatus 200 (that has an image pickup element configured to pick up an image formed via a movable optical member described below). In the lens apparatus 100, a zoom lens group 101 as the movable optical member is moved along the optical axis to change the focal length of the lens apparatus 100. 'A lens group' is also referred to as 'a lens unit'. A zoom ring 102 is an operation member that is rotated to drive the zoom lens group 101, and constitutes a drive mechanism to move the zoom lens group 101 along the optical axis. A mechanical end member (stopper) may be provided to limit the rotation range of the zoom ring 102. A position detection unit 103 (also referred to as a detection unit or detector) detects a specific quantity (physical quantity) for a processor (described later) to determine (obtain or acquire) the position of the zoom lens group 101 on the optical axis. The detection unit 103 is intended here to determine the position of the zoom ring 102. The term "rotation angle (degree)" can also be substituted for the "position". Herein, coordinates of translation and rotation as degrees of freedom are expressed as "position". The detection unit 103 may be an encoder, for example, that includes a light emitting unit, a light receiving unit, and a reflective scale, and outputs a two phase signal in analog form at a phase difference of 90 degrees between the two. The output of the detection unit 103 is input into a central processing unit 104 (CPU) (also referred to as a processing unit or processor) and is converted from the analog signal to a digital signal by an analog-to-digital (A/D) converter in the processing unit. Thereafter, the processing unit performs an arithmetic operation on the digital signal to produce (generate) the positional information about the optical member. In the lens apparatus 100, the rotation angle of the zoom ring 102 corresponds to the position of the zoom lens group 101. A zoom clutch 105 is a mechanism to switch between a first state of the driving power of a zoom motor 106 described below being transmitted to the zoom ring 102 and a second state of the driving power of the zoom motor 106 being not transmitted to the zoom ring 102. The first state allows the zoom lens group 101 to be servo-driven, and the second state allows the zoom lens group 101 to be manually driven (operation). The information as to the current state of the apparatus can be input to the processing unit via a switch 107 to switch the states of the zoom clutch 105. The zoom motor 106 is a motor (drive unit) for driving the zoom ring 102 and is controlled by the processing unit via a drive circuit 108. A communication circuit 109 (communication unit) is a circuit for communication with an external apparatus, which is, in the present exemplary embodiment, the camera apparatus 200 (also called imaging apparatus main body) outside the lens apparatus. The processing unit controls the zoom motor 106 and controls communication with the camera apparatus 200 via the communication circuit 109, based on software (programs). Referring to FIG. 1, the external apparatus is not limited to the camera apparatus 200 but may be a processing apparatus 300 (an image processing apparatus or a computer) to process or uses image data (image signals) generated through image capture by the camera apparatus 200. The external apparatus may perform composite processing on the image data and computer graphics (CG). As is well known, the positional information about the optical member is used in the composite processing. The external apparatus may perform various kinds of processing (image data processing) such as manipulation, measurement, and analysis of the image data, not limited to the composite processing. Thus, the present exemplary embodiment should also be understood as a system including the lens apparatus 100, the camera apparatus 200, and the processing apparatus 300.

The camera apparatus 200 will be described. In the camera apparatus 200, an imaging device 201 captures an image formed by the lens apparatus 100 via an optical member (imaging or photoelectric conversion). A video signal generation unit 203 generates a video signal (image data) based on an electrical signal generated by imaging. A viewfinder (display unit) 202 can perform display based on the video signal or display of information about zoom operations. A display processing unit 204 can acquire the video signal from the video signal generation unit 203 and drawing information from a CPU 205 (processing unit) to generate a signal for display on the viewfinder 202. The processing unit can generate drawing information (computer graphics and the like) and perform composite processing on the video signal, based on the information acquired from the lens apparatus 100 via a communication circuit 206 (communication unit) based on software (programs) described below.

Figure 2:
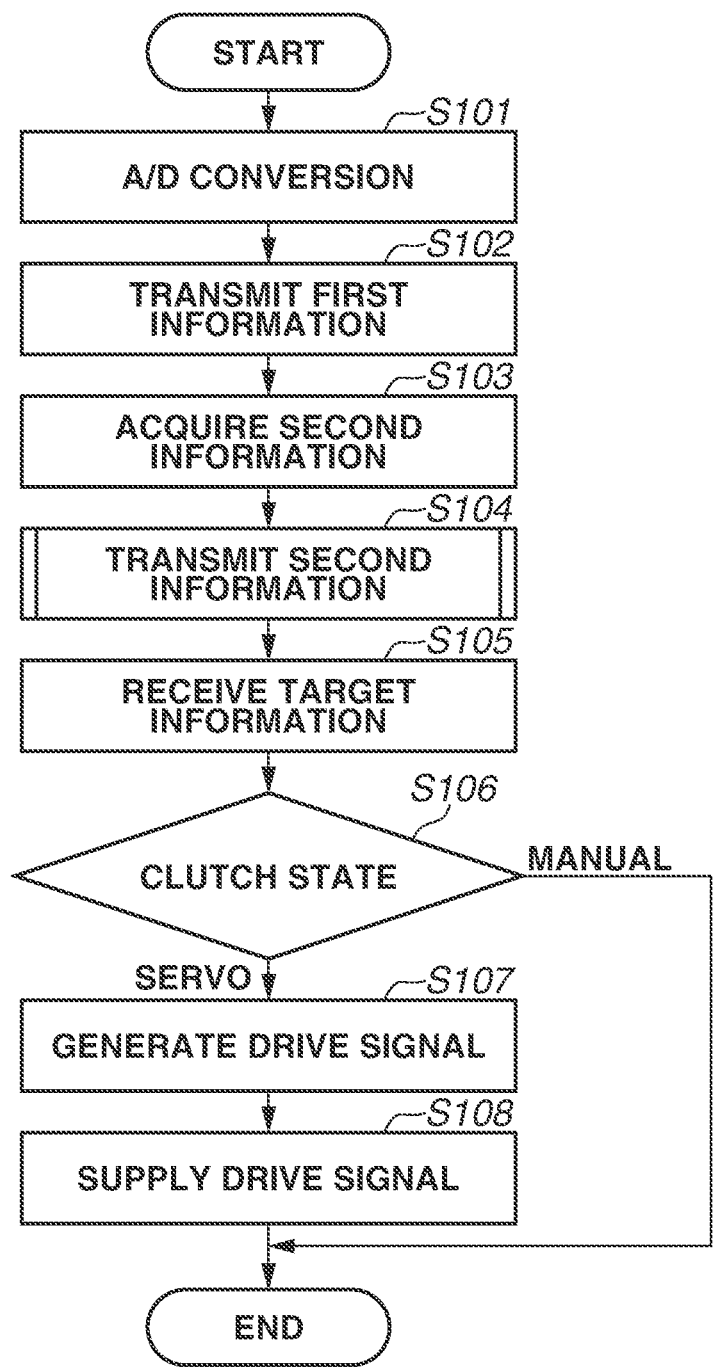
FIG. 2 is a flowchart of processing in the first exemplary embodiment.

Processing performed by the CPU 104 in the lens apparatus 100 will be described. FIG. 2 is a flowchart of processing in the first exemplary embodiment. The processing (main processing) is performed in a predetermined cycle (for example, 1 KHz) based on time keeping by a timer in the CPU 104. First, in step S101, the CPU 104 performs A/D conversion of an analog signal output from the detection unit 103. In step S102, the CPU 104 generates first information as to the point in time of the performed A/D conversion (the point in time when the detection unit detects the quantity relating to the position of the optical member), and transmits the first information to the camera apparatus 200. The process in step S102 will be described below in detail.

In step S103, based on the digital signal produced by the A/D conversion, the CPU 104 performs an arctangent operation or another operation on the two-phase signal to produce positional information about the zoom ring 102 (the zoom lens group 101) within the movable range (second information that, for example, is normalized positional information). The CPU 104 also determines information about the focal length of the lens apparatus 100 from the positional information, referring to a lookup table stored in advance in the CPU 104. In step S104, the CPU 104 transmits the positional information to the camera apparatus 200. The processing in step S104 will be described below in detail with reference to FIG. 3. In step S105, the CPU 104 receives information about the target position of the zoom lens group (target information) from the camera apparatus 200. In step S106, the CPU 104 determines whether the servo driving is available (the manual driving is available) based on the state of the switch 107. If the servo driving is available (YES in step S106), the processing proceeds to step S107; otherwise (NO in step S106) (the manual driving is available), the processing is ended. In steps S107 and S108, the CPU 104 generates a drive signal (control signal) to match the position based on the positional information produced in step S103 and the target position based on the information received in step S105, and transmits the drive signal to the drive circuit 108. The generation of the drive signal here may be performed in well-known servo control or feedback control.

Figure 3:
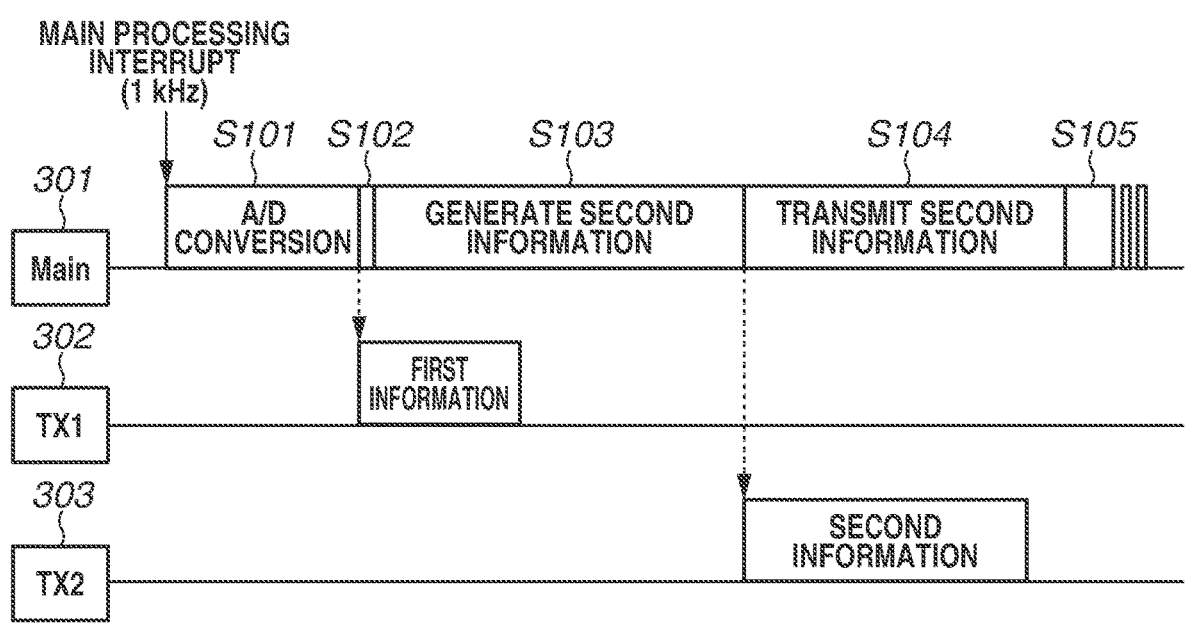
FIG. 3 is a diagram illustrating processing and signal timings according to the first exemplary embodiment.

FIG. 3 is a diagram illustrating processing and signal timings according to the first exemplary embodiment. Referring to FIG. 3, progress 301 of the processing (main processing) described in FIG. 2 is illustrated in a time-series manner A signal 302 is used for a communication line TX1 for transmitting the first information. A signal 303 is used for a communication line TX2 for transmitting the second information. The first information is depicted, for example, by a rectangular wave signal (pulse signal) with a rising edge and a falling edge, and the rising edge indicates the point in time when A/D conversion is performed. In step S102, immediately after the completion of the A/D conversion, the signal including the rising edge is output. The second information may be positional information normalized in the movable range, determined in step S103. The second information may also be an optical physical quantity (focal length here).

As above, the first information as to the point in time when the detection unit detects the quantity relating to the position of the optical member is transmitted from the lens apparatus (optical apparatus) to an external apparatus. This makes it possible to provide an optical apparatus that is beneficial in the correctness of association between the position and point in time of the optical member. The optical apparatus according to the present exemplary embodiment has, but not limited thereto, a set of the movable optical member and the detection unit, and the processing unit is configured to generate the first information and the second information relating to the set.

Figure 4:
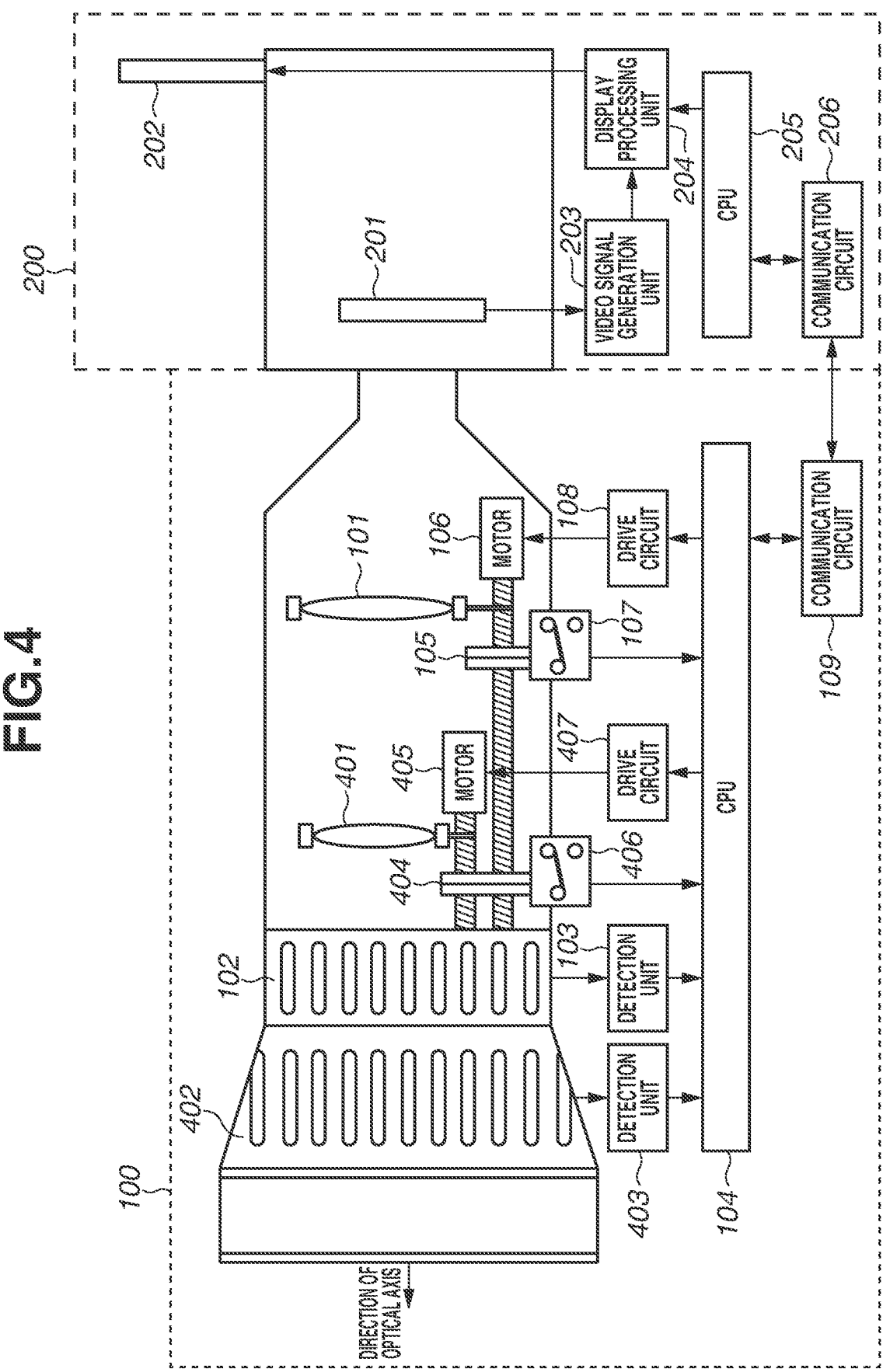
FIG. 4 is a diagram illustrating a configuration example of optical apparatuses according to second and third exemplary embodiments.

An optical apparatus according to a second exemplary embodiment will be described. FIG. 4 is a diagram illustrating a configuration example of optical apparatuses according to second and third exemplary embodiments. Referring to FIG. 4, a focus lens group 401 as a movable optical member is moved along the optical axis to change the object distance to a lens apparatus 100. A focus ring 402 is an operation member that is rotated to drive the focus lens group 401, and constitutes a drive mechanism to move the focus lens group 401 along the optical axis. A mechanical end member (stopper) may be provided to limit the rotation range of the focus ring 402. A detection unit 403 (hereinafter also simply called detection unit) detects a specific quantity (physical quantity) to determine the position of the focus lens group 401 on the optical axis. The detection unit 403 is intended here to determine the position (rotation angle) of the focus ring 402. The detection unit 403 may be an encoder, for example, that includes a light emitting unit, a light receiving unit, and a reflective scale, and outputs a two-phase signal in analog form at a phase difference of 90 degrees between the two. The output of the detection unit 403 is input into a CPU 104 (processing unit) and is converted from the analog signal to a digital signal by an A/D converter in the processing unit. Thereafter, the processing unit performs an arithmetic operation on the digital signal to produce the positional information about the optical member. The lens apparatus 100 is configured such that a rotation angle of the focus ring 402 corresponds to a position of the focus lens group 401. A focus clutch 404 is a mechanism to switch between a first state of the driving power of a focus motor 405 described below being transmitted to the focus ring 402 and a second state of the driving power being not transmitted to the focus ring 402. The first state allows the focus lens group 401 to be servo-driven, and the second state allows the focus lens group 401 to be manually driven (operation). The information as to the current state of the apparatus can be input to the processing unit via a switch 406 to switch between the states of the focus clutch 404. The focus motor 405 is a motor for driving the focus ring 402 and is controlled by the processing unit via a drive circuit 407.

Figure 5:
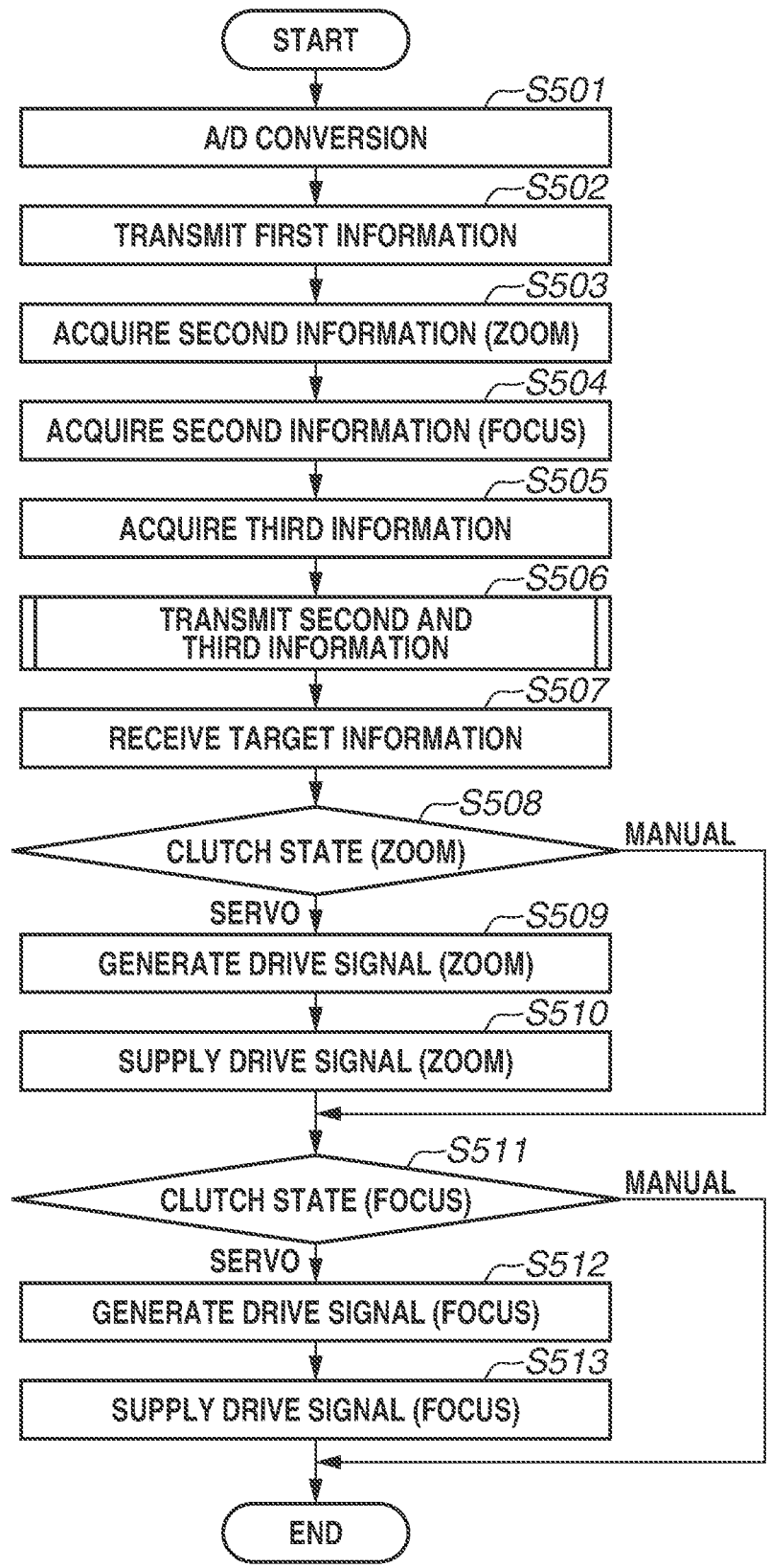
FIG. 5 is a flowchart of processing in the second exemplary embodiment.

Processing performed by the CPU 104 in the lens apparatus 100 will be described. FIG. 5 is a flowchart of processing in the second exemplary embodiment. The processing (main processing) is performed in a predetermined cycle (for example, 1 KHz) based on time keeping by a timer in the CPU 104. First, in step S501, the CPU 104 performs A/D conversion of analog signals output from the detection unit 103 and the detection unit 403. One A/D converter is connected in series to a plurality of detection units, and the A/D conversion is performed using a multiplexer. In step S502, for each of the detection units, the CPU 104 generates first information about the point in time when the A/D conversion is performed (the point in time when the detection unit detects the quantity relating to the position of the optical member), and transmits the first information to a camera apparatus 200. The process in step S502 will be described below in detail.

In step S503, based on each digital signal produced by the A/D conversion, the CPU 104 performs an arctangent operation or another operation on the two-phase signal to produce positional information about the zoom ring 102 (the zoom lens group 101) within the movable range (second information that is, for example, normalized positional information). In addition, the CPU 104 determines information about the focal length of the lens apparatus 100 from the positional information, referring to a lookup table stored in advance in the CPU 104. In step S504, based on the digital signal produced by the A/D conversion, the CPU 104 performs an arctangent operation or another operation on the two-phase signal to produce positional information about the zoom ring 102 (the zoom lens group 101) within the movable range (second information that is, for example, normalized positional information). In addition, the CPU 104 determines information about the object distance to the lens apparatus 100 from the positional information, referring to a lookup table stored in advance in the CPU 104.

In step S505, the CPU 104 determines third information (hereinafter also called correction information) about the difference between the point in time when the detection unit detects the quantity relating to the position of the optical member and the point in time indicated by the first information. The third information will be described below in detail. In step S506, the CPU 104 transmits the second information and the third information about the zoom lens group and the focus lens group to the camera apparatus 200. The process in step S506 will be described below in detail with reference to FIG. 6. In step S507, the CPU 104 receives the information about the target position of the zoom lens group and the information about the target position of the focus lens group from the camera apparatus 200. In step S508, based on the state of the switch 107, the CPU 104 determines whether the servo driving is available (the manual driving is available). If the servo driving is available (YES in step S508), the processing proceeds to step S509; otherwise (NOT in step S508) (the manual driving is available), the processing proceeds to step S511. In steps S509 and S510, the CPU 104 generates a drive signal (control signal) to match the position based on the positional information produced in step S503 and the target position based on the information received in step S507, and transmits the drive signal to the drive circuit 108. The generation of the drive signal may be performed in well-known servo control or feedback control. In step S511, based on the state of the switch 406, the CPU 104 determines whether the servo driving is available (the manual driving is available). If the servo driving is available (YES in step S511), the processing proceeds to step S512; otherwise (NOT in step S511) (the manual driving is available), the processing is ended. In steps S511 and S512, the CPU 104 generates a drive signal (control signal) to match the position based on the positional information produced in step S504 and the target position based on the information received in step S507, and transmits the drive signal to the drive circuit 407. The generation of the drive signal may be performed in well-known servo control or feedback control.

FIG. 6 is a diagram illustrating processing and signal timings according to the second exemplary embodiment. Referring to FIG. 6, progress 601 of the processing (main processing) described in FIG. 5 is illustrated in a time-series manner. A signal 602 is used for a communication line TX1 for transmitting the first information. A signal 603 is used for a common communication line TX2 for transmitting the second information and third information. A dashed line 604 indicates the point in time of the completion of the A/D conversion of the quantity relating to the position detected by the detection unit 103. A dashed line 605 indicates the point in time of the completion of the A/D conversion of the quantity relating to the position detected by the detection unit 403. An arrow 606 indicates the A/D conversion period for the output signal from the detection unit 103. The A/D conversion period here varies depending on the settings of acquisition time and other conditions but can be considered to be uniquely determined due to few dynamic changes with specific settings. In the present exemplary embodiment, the A/D conversion period is 1 μsec/channel. The output signal from the detection unit 103 is a two-phase signal and thus the A/D conversion period is 2 μsec. An arrow 607 indicates the A/D conversion period for the output signal from the detection unit 403. The output signal from the detection unit 403 is a two-phase signal and thus the A/D conversion period is 2 psec. An arrow 608 indicates the A/D conversion period for the output signal from another detection unit. The output signal from the detection unit is a two-phase signal and thus the A/D conversion period is 2 μsec. The other detection unit here may detect the quantity relating to the position of a movable member involved in the opening diameter (diameter) of an aperture diaphragm, for example. The position here may be the rotation angle of the member in a narrow sense. The position (rotation angle) corresponds to the opening diameter (diameter) of the aperture diaphragm. Coordinates for the degrees of freedom of the opening diameter (diameter) are also expressed as "position". An arrow 609 indicates the duration from the completion of all the A/D conversions to outputting of the first information, and the duration can be determined with the timer in the CPU 104. Assuming that the clock frequency of the CPU 104 is 100 MHz, for example, if the count value of the timer is 10, the duration is 0.1 μsec.

Next, the third information (correction information) determined in step S505 will be described. The third information is information about the difference (period) between the point in time when the detection unit detects the quantity relating to the position of the optical member and the point in time indicated by the first information. Third information 610 about the zoom lens group 101 equals the total of the periods indicated by the arrows 607, 608, and 609, and third information 611 about the focus lens group 401 equals the total of the periods indicated by the arrows 608 and 609. Here, the third information is expressed with a least significant bit (LSB) of 0.1 μsec. Then, the third information 610 is 41 bits and the third information 611 is 21 bits. In step S506, the CPU 104 transmits the second information about the zoom lens group 101 produced in step S503, the second information about the focus lens group 401 produced in step S504, and the third information 610 and third information 611 determined in step S505. The second information to be transmitted may be positional information normalized in the movable range. The second information may be an optical physical quantity (for example, a focal length or an object distance). The second information and the third information may be related to either the zoom lens group 101 or the focus lens group 401, or may be related to at least either the zoom lens group 101 or the focus lens group 401 by an instruction from the camera apparatus 200.

As above, the optical apparatus transmits the information (third information) about the difference (period) between the point in time when the detection unit detects the quantity relating to the position of the optical member and the point in time indicated by the first information to an external apparatus. This makes it possible to provide an optical apparatus that is beneficial in the correctness of association between the position and the point in time of the optical member. In the present exemplary embodiment, the point in time when the detection unit detects the quantity relating to the position of the optical member is the point in time when the A/D conversion completes. Alternatively, the point in time when the sampling of the A/D conversion completes may be used. The point in time when the detection unit detects the quantity relating to the position of the optical member may be a specific point (for example, a midpoint) in the period for A/D conversion from the start of the sampling to the end of quantization. The detection unit is not limited to an encoder that outputs an analog signal but may be any unit to output positional information through serial communication. The optical apparatus according to the present exemplary embodiment, but not limited to, includes a plurality of sets of a movable optical member and a detection unit, and the processing unit is configured to generate first information common to the plurality of sets, and second information and third information with respect to each of the plurality of sets. The external apparatus is not limited to the camera apparatus 200 but may be similar to the processing apparatus 300 as described above with reference to FIG. 1. Thus, the present exemplary embodiment should be understood as a system including the lens apparatus 100, the camera apparatus 200, and the processing apparatus 300.

An optical apparatus according to a third exemplary embodiment will be described. A configuration example of the optical apparatus according to the third exemplary embodiment is similar to that according to the second exemplary embodiment illustrated in FIG. 4. FIG. 7 is a flowchart of processing in the third exemplary embodiment.

The processing (main processing) is performed in a predetermined cycle (for example, 1 KHz) based on time keeping by a timer in a CPU 104. First, in step S701, the CPU 104 performs A/D conversion of analog signals output from a detection unit 103, a detection unit 403, and another detection unit (not illustrated). One A/D converter is connected in sequence to a plurality of detection units, and the A/D conversion is performed using a multiplexer. The A/D conversion is performed for the detection unit 103, the detection unit 403, and the other detection unit in this order, and the A/D conversion is performed for two channels per detection unit, total six channels. In step S702, the CPU 104 clears the timer (time keeping) therein, and in step S703, the timer in the CPU 104 starts time counting (time keeping). In step S704, based on digital signals produced by the A/D conversion for the two channels, the CPU 104 can perform an arctangent operation or another operation on the two-phase signals to produce positional information (second information) about the zoom ring 102 (the zoom lens group 101) within the movable range. The positional information can be normalized positional information. In addition, the CPU 104 determines information about the focal length of a lens apparatus 100 from the positional information, referring to a lookup table stored in advance in the CPU 104. In step S705, based on the digital signals produced by the A/D conversion on the two channels, the CPU 104 can perform an arctangent operation or another operation on the two-phase signals to produce positional information (second information) about the focus ring 402 (the focus lens group 401) within the movable range. The positional information can be normalized positional information. In addition, the CPU 104 determines information about the object distance to the lens apparatus 100 from the positional information, referring to a lookup table stored in advance in the CPU 104. In step S706, the CPU 104 receives information about the target position of the zoom lens group and information about the target position of the focus lens group from a camera apparatus 200. In step S707, based on the state of the switch 107, the CPU 104 determines whether the servo driving is available (the manual driving is available). If the servo driving is available (YES in step S707), the processing proceeds to step S708; otherwise (NO in step S707) (the manual driving is available), the processing proceeds to step S710. In steps S708 and S709, the CPU 104 generates a drive signal (control signal) to match the position based on the positional information produced in step S704 and the target position based on the information received in step S706, and transmits the drive signal to the drive circuit 108. The generation of the drive signal may be performed in well-known servo control or feedback control. In step S710, based on the state of the switch 406, the CPU 104 determines whether the servo driving is available (the manual driving is available). If the servo driving is available (YES in step S710), the processing proceeds to step S711; otherwise (NO in step S106) (the manual driving is available), the processing is ended. In steps S711 and S712, the CPU 104 generates a drive signal (control signal) to match the position based on the positional information produced in step S705 and the target position based on the information received in step S706, and transmits the drive signal to the drive circuit 407. The generation of the drive signal may be performed in well-known servo control or feedback control. At the end of the main processing described above, the apparatus enters a state of waiting for an interrupt of the main processing performed in a cycle of 1 KHz or an interrupt for positional information transmission request from the camera apparatus 200, which will be described below.

FIG. 8 is a flowchart of processing (interrupt processing) in the third exemplary embodiment. The interrupt processing is performed by the CPU 104 in response to the positional information transmission request from the camera apparatus 200 to the lens apparatus 100. In step S801 in FIG. 8, the CPU 104 reads the count value of the timer that has started counting in step S703. Thereafter, based on the read count value and the clock frequency of the CPU 104, the CPU 104 generates first information (also called correction information). The first information is information about the period from the point in time when the A/D conversion completes (the point in time when the detection unit detects the quantity relating to the position of the optical member) to the point in time when the positional information transmission request is received (or the point in time when the transmission of the positional information (second information) is started in response to the receipt of the request). In step S802, the CPU 104 transmits the first information and second information about the zoom lens group and the focus lens group to the camera apparatus 200. The process in step S802 will be described below in detail with reference to FIG. 9. The first information is attached to and transmitted with the second information about the zoom lens group 101 and the focus lens group 401.

The first information will be described with reference to FIG. 9. FIG. 9 is a diagram illustrating processing and signal timings according to the third exemplary embodiment. Referring to FIG. 9, progress 901 of the processing (main processing) in FIG. 7 is illustrated in a time-series manner. Progress 902 of the processing (interrupt processing) in FIG. 8 is illustrated in a time-series manner A signal 903 is used for a common communication line TX2 for transmitting the first information and the second information. A dashed line 904 indicates the point in time of the completion of the A/D conversion of the quantity relating to the position detected by the detection unit 103. A dashed line 905 indicates the point in time of the completion of the A/D conversion of the quantity relating to the position detected by the detection unit 403. An arrow 906 indicates the A/D conversion period for the output signal from the detection unit 103. The A/D conversion period here varies depending on the settings of the acquisition time and other conditions but can be considered to be uniquely determined due to few dynamic changes with specific settings. In the present exemplary embodiment, the A/D conversion period is 1 µsec/channel. The output signal from the detection unit 103 is a two-phase signal and thus the A/D conversion period is 2 µsec. An arrow 907 indicates the A/D conversion period for the output signal from the detection unit 403. The output signal from the detection unit 403 is a two-phase signal and thus the A/D conversion period is 2 µsec. An arrow 908 indicates the A/D conversion period of the output signal from the other detection unit. The output signal from the detection unit is a two-phase signal and thus the A/D conversion period is 2 µsec. An arrow 909 indicates the period from the start of counting by the timer to the receipt of a positional information transmission request. Assuming that the clock frequency of the CPU 104 is 100 MHz, for example, if the count value of the timer illustrated by the arrow 909 is 5000, the period corresponding to the arrow 909 is 50 µsec. First information 910 about the zoom lens group 101 is indicated by the arrows 907, 908, and 909. First information 911 about the focus lens group 401 is indicated by the arrows 908 and 909. That is, the size of the first information 910 is 54 µsec, and the size of the first information 911 is 52 µsec. The first information is expressed with an LSB of 0.1 µsec. In addition, the point in time of the completion of the A/D conversion (the point in time when the detection unit detects the quantity relating to the position of the optical member) is earlier than the point in time of the positional information transmission request, and thus the first information is expressed as a negative value. Hence, the first information 910 is −540 bits, and the first information 911 is −520 bits.

As above, the CPU 104 transmits information about the difference between the point in time when the detection unit detects the quantity relating to the position of the optical member and the point in time when the positional information transmission request is received, as first information, to an external apparatus. This makes it possible to provide an optical apparatus that is beneficial in the correctness of association between the position and the point in time of the optical member. In the above-described configuration, the lens apparatus 100 acquires the positional information before the receipt of the positional information transmission request from the camera apparatus 200. However, the disclosure is not limited to this configuration and the lens apparatus 100 may be configured to acquire the correction information (the first information) and the positional information (the second information) after the receipt of the positional information transmission request from the camera apparatus 200. In addition, in the above-described configuration, an interrupt by a positional information transmission request is not permitted during the main processing. Alternatively, the interrupt may be permitted during the main processing. The optical apparatus according to the present exemplary embodiment, but not limited to, includes a plurality of sets of a movable optical member and a detection unit, and the processing unit is configured to generate the first information and second information about each of sets. As in the first exemplary embodiment, the external apparatus is not limited to the camera apparatus 200 but may be similar to the processing apparatus 300 described above with reference to FIG. 1. Thus, the present exemplary embodiment should be understood as a system including the lens apparatus 100, the camera apparatus 200, and the processing apparatus 300.

Other Exemplary Embodiments

One or more functions or methods (controls thereof) of the above-described exemplary embodiments can be implemented by programs carrying out these functions or methods. The programs are supplied to an apparatus or system via a network or storage medium, and can be read and run by one or more processors in a computer in the apparatus or system. The functions can also be implemented by a circuit (for example, an application specific integrated circuit (ASIC)) carrying out the functions.

The above exemplary embodiments of the disclosure have been described. However, the disclosure is not limited to these exemplary embodiments but can be modified and changed in various manners within the gist of the disclosure.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-187287, filed Nov. 10, 2020, which is hereby incorporated by reference herein in its entirety.

What is claimed is:

1. An apparatus comprising:
   an optical member that is any one of a lens for changing a focal length of the apparatus, a lens for changing a focus state of the apparatus and an aperture stop included in the apparatus;
   a detector configured to perform detection of information relating to a position of the optical member and output an analog signal corresponding to the information;
   a processor configured to convert the analog signal into a digital signal and generate positional information of the optical member based on the digital signal; and
   a communication unit configured transmit information to another apparatus connected to the apparatus,
   wherein the processor is configured to generate timing information that is information of timing in a period in which the processor is converting the analog signal into the digital signal, and
   wherein the communication unit separately transmits each of the positional information and the timing information via a plurality of communication lines different from each other.

2. The apparatus according to claim 1, wherein the communication unit is configured to transmit a pulse signal indicating the timing information.

3. The apparatus according to claim 1, wherein the processor is configured to generate difference information relating to a difference between a point in time of the detection and a point in time indicated by the timing information, and the communication unit is configured to transmit the difference information.

4. The apparatus according to claim 3, wherein the communication unit is configured to transmit the difference information with the difference information attached to the positional information.

5. The apparatus according to claim 1,
   wherein the communication unit is configured to receive a request signal for requesting the positional information, and
   wherein the processor is configured to generate, as the timing information, information relating to a difference between a point in time of the detection and a point in time when the communication unit receives the request signal.

6. The apparatus according to claim 1, wherein the processor is configured to generate difference information relating to a difference between a point in time of the detection and a point in time indicated by the timing information, and the communication unit is configured to transmit the positional information and the difference information via a communication line common therewith.

7. The apparatus according to claim 1, wherein the optical member is configured to change a focal length, an object distance, or an aperture diameter.

8. The apparatus according to claim 1, comprising a plurality of sets of the optical member and the detector,
   wherein the processor is configured to generate the timing information common to the plurality of sets.

9. The apparatus according to claim 1, comprising a plurality of sets of the optical member and the detector,
   wherein the processor is configured to generate the timing information with respect to each of the plurality of sets.

10. The apparatus according to claim 1, wherein the apparatus is detachably attached to a camera apparatus including an element configured to pick up an image formed via the optical member.

11. The apparatus according to claim 1, further comprising an element configured to pick up an image formed via the optical member.

12. A camera apparatus comprising:
    a second processor; and
    a memory that stores a program which, when executed by the second processor, causes the second processor to function as:
    a communication unit configured to receive the positional information and the timing information from the apparatus of claim 1; and
    an element configured to pick up an image formed via the optical member.

13. A processing apparatus comprising:
    a second processor; and
    a memory that stores a program which, when executed by the second processor, causes the second processor to function as:
    a communication unit configured to receive the positional information and the timing information from the apparatus of claim 1,
    wherein the processing apparatus is configured to perform processing relating to image data, generated based on an image formed via the optical member, based on the positional information and the timing information.

14. A system comprising:
    the apparatus according to claim 10; and
    a processing apparatus configured to perform processing relating to image data generated via the element.

15. A control method for an apparatus, the apparatus including an optical member that is any one of a lens for changing a focal length of the apparatus, a lens for changing a focus state of the apparatus and an aperture stop included in the apparatus, the control method comprising:
    detecting information relating to a position of the optical member and outputting an analog signal corresponding to the information;
    converting the analog signal into a digital signal and generating positional information of the optical member based on the digital signal;

generating timing information that is information of timing in a period in which the analog signal is being converted into the digital signal; and separately transmitting, to an outside of the apparatus, each of the positional information and the timing information via a plurality of communication lines different from each other.

16. The method according to claim 15, further comprising:

generating difference information relating to a difference between a point in time of the detection and a point in time indicated by the timing information; and transmitting the difference information.

17. The method according to claim 15, further comprising generating image data based on an image formed via the optical member.

18. The method according to claim 17, further comprising performing processing relating to the image data based on the positional information and the timing information.

19. A non-transitory computer readable storage medium storing a program for causing a computer to perform control of a method for an apparatus, the apparatus including an optical member that is any one of a lens for changing a focal length of the apparatus, a lens for changing a focus state of the apparatus and an aperture stop included in the apparatus, the method comprising:

detecting information relating to a position of the optical member and outputting an analog signal corresponding to the information;

converting the analog signal into a digital signal and generating positional information of the optical member based on the digital signal;

generating timing information that is information of timing in a period in which the analog signal is being converted into the digital signal; and separately transmitting, to an outside of the apparatus, each of the positional information and the timing information via a plurality of communication lines different from each other.

* * * * *